United States Patent
Ohara et al.

(10) Patent No.: US 11,350,403 B2
(45) Date of Patent: May 31, 2022

(54) TERMINAL AND BASE STATION APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/051,024

(22) PCT Filed: May 15, 2018

(86) PCT No.: PCT/JP2018/018825
§ 371 (c)(1),
(2) Date: Oct. 27, 2020

(87) PCT Pub. No.: WO2019/220551
PCT Pub. Date: Nov. 21, 2019

(65) Prior Publication Data
US 2021/0127370 A1  Apr. 29, 2021

(51) Int. Cl.
*H04W 72/04* (2009.01)
*H04W 74/08* (2009.01)

(52) U.S. Cl.
CPC ..... *H04W 72/042* (2013.01); *H04W 74/0833* (2013.01)

(58) Field of Classification Search
CPC ............................................... H04W 74/0833
See application file for complete search history.

(56) References Cited

U.S. PATENT DOCUMENTS

| 2010/0296467 | A1 | 11/2010 | Pelletier et al. |
| 2012/0250520 | A1 | 10/2012 | Chen et al. |
| 2014/0169323 | A1* | 6/2014 | Park .................. H04W 72/042 |

(Continued)

FOREIGN PATENT DOCUMENTS

| JP | 2013229770 A | 11/2013 |
| JP | 2014045497 A | 3/2014 |
| JP | 2014510457 A | 4/2014 |

(Continued)

OTHER PUBLICATIONS

3GPP TS 38.213 V15.1.0 "3rd Generation Partnership Project; Technical Specification Group Radio Access Network; NR; Physical layer procedures for control (Release 15)" Mar. 2018 (77 pages).

(Continued)

*Primary Examiner* — Ronald B Abelson
(74) *Attorney, Agent, or Firm* — Osha Bergman Watanabe & Burton LLP

(57) ABSTRACT

A terminal includes a processor, coupled to a transceiver, that monitors a PDCCH (Physical downlink control channel) candidate in a first search space during a random access procedure. The transceiver receives a random access response or a PDSCH (Physical downlink shared channel) for contention resolution from a base station, based on information included in the PDCCH candidate, and the transceiver receives a PDSCH or transmit an uplink signal based on information included in a PDCCH candidate monitored in the first search space, unless a second search space of a type other than the first search space is configured after the random access procedure is completed.

5 Claims, 5 Drawing Sheets

(56) References Cited

U.S. PATENT DOCUMENTS

| | | | |
|---|---|---|---|
| 2016/0345364 A1 | 11/2016 | Uchino et al. | |
| 2019/0150202 A1 | 5/2019 | Harada et al. | |

FOREIGN PATENT DOCUMENTS

| | | |
|---|---|---|
| JP | 2015142372 A | 8/2015 |
| WO | 2013066386 A1 | 5/2013 |
| WO | 2017195847 A1 | 11/2017 |

OTHER PUBLICATIONS

3GPP TS 38.211 V15.1.0 "3rd Generation Partnership Project; Technical Specification Group Radio Access Network; NR; Physical channels and modulation (Release 15)" Mar. 2018 (90 pages).

3GPP TSG RAN WG1 Meeting RAN1#92; R1-1802022 "Remaining details on RACH procedure" Nokia, Nokia Shanghai Bell; Athens, Greece; Feb. 26-Mar. 2, 2018 (11 pages).

3GPP TSG-RAN WG1 92bis; R1-1805754 "Summary of Remaining Details on RACH Procedure" Qualcomm Incorporated; Sanya, China; Apr. 16-20, 2018 (34 pages).

International Search Report issued in International Application No. PCT/JP2018/018825, dated Jul. 31, 2018 (5 pages).

Written Opinion issued in International Application No. PCT/JP2018/018825; dated Jul. 31, 2018 (3 pages).

Office Action issued in counterpart Indian Application No. 2020370461165 dated Sep. 16, 2021 (5 pages).

Inquiry issued in counterpart Russian Application No. 2020137302/07 (068802) mailed Sep. 22, 2021 (12 pages).

Office Action issued in Japanese Application No. 2020-518865; dated Dec. 21, 2021 (6 pages).

* cited by examiner

TERMINAL AND BASE STATION APPARATUS

TECHNICAL FIELD

The present invention relates to a user device and a base station apparatus in a radio communication system.

BACKGROUND ART

At present, in 3GPP (Third Generation Partnership Project), development of a radio communication system has been in progress, which is referred to as an NR (New Radio), in order to realize further enlargement of a system capacity, further increase of a data transmission speed, and further reduction of a delay in a radio communication section. (This radio communication system may be referred to hereinafter as 5G or NR.) In 5G, various techniques of radio communication have been discussed to satisfy requirements of obtaining a throughput of 10 Gbps or more and keeping a delay in a radio communication section equal to or less than 1 ms.

In NR, a user device performs cell detection and cell identification by use of a synchronization signal transmitted by a base station apparatus, and obtains part of system information required for an initial access, in the initial access at the time of establishing connection between the user device and the base station apparatus (for example, see Non-Patent Document 1).

Also, in NR, it is expected to use a wide frequency range, from a low frequency band similar to that for the LTE (Long Term Evolution) to a higher frequency band than that for the LTE. As a transmission loss increases in the high frequency band, it is considered to apply beamforming with a small beam width to compensate for the transmission loss (for example, see Non-Patent Document 2).

RELATED-ART DOCUMENTS

Non-Patent Document

Non-Patent Document 1: 3GPP TS 38.213 V15.1.0 (2018-03)
Non-Patent Document 2: 3GPP TS 38.211 V15.1.0 (2018-03)

SUMMARY OF THE INVENTION

Problem to be Solved by the Invention

In NR, plural types are defined for search spaces as sets of PDCCH (Physical downlink control channel) candidates to be monitored by a user device. However, it has not been clear which type of search space is monitored by the user device, and it has not been clear when such a search space is monitored by the user device.

The present invention has been made in view of the above-described problem, and an object of a user device is to identify a search space for use in the random access procedure in the NR, and perform monitoring efficiently.

Means to Solve the Problem

According to a disclosed technique, a user device for communicating with a base station apparatus is provided, and includes a receiving unit configured to receive a DL (Downlink) signal included in a search space as a set of candidates of a PDCCH (Physical downlink control channel) from the base station apparatus, a control unit configured to monitor for obtaining a PDCCH candidate addressed to the user device based on a valid period defined for the search space, and a communication unit configured to receive a PDSCH (Physical downlink shared channel) or transmit a UL (Uplink) signal to the base station apparatus, based on information included in the PDCCH candidate addressed to the user device.

Advantage of the Invention

According to the disclosed technique, an object of a user device is to identify a search space for use in the random access procedure in the NR, and perform monitoring efficiently.

MODE FOR CARRYING OUT THE INVENTION

Figure 1:
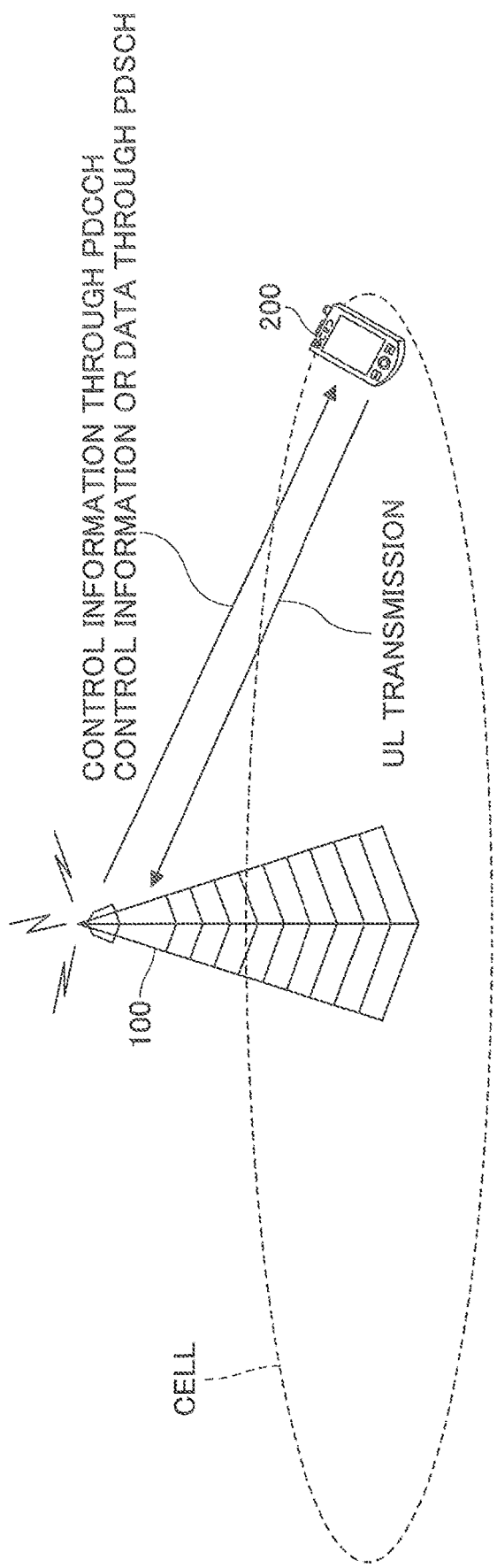
FIG. 1 is a view illustrating a configuration example of a radio communication system in an embodiment of the present invention.

An embodiment of the present invention is described below by referring to the drawings. Note that the embodiment described below is only one example, and the embodiment to which the present invention is applied is not limited to the following embodiment.

For the operation of a radio communication system of the embodiment of the present invention, existing techniques are used suitably. However, those existing techniques are, for example, the existing LTE, but are not limited to the existing LTE. The term "LTE" used in the present specification should be read to have a broad meaning inclusive of LTE-Advanced and systems later than LTE-Advanced (for example, NR or 5G), unless otherwise mentioned.

In the embodiment of the present invention to be described hereinafter, terms used in the existing LTE are used, including SS (Synchronization Signal), PSS (Primary SS), SSS (Secondary SS), PBCH (Physical broadcast channel), PRACH (Physical RACH), DL (Downlink), UL (Uplink) and the like. Those are for the convenience in the description. Signals, functions and the like similar to those may be referred to with other names.

In the embodiment of the present invention, duplex systems may be a TDD (Time Division Duplex) system, FDD (Frequency Division Duplex) system, or others (for example, Flexible Duplex or the like).

In the description below, transmitting a signal with a transmission beam may be transmission of the signal multiplied by a precoding vector (precoded by the precoding vector). Similarly, receiving a signal with a reception beam may be multiplication of the received signal by a predetermined weight vector. Also, transmitting a signal with a transmission beam may be expressed as transmission of the signal through a particular antenna port. Similarly, receiving a signal with a reception beam may be expressed as reception of the signal through a particular antenna port. The term of antenna port means a logical antenna port as defined in 3GPP standards or a physical antenna port.

Methods of forming a transmission beam and reception beam are not limited to those methods described above. For example, a method of changing an angle of each antenna in a base station apparatus 100 or a user device 200 having plural antennas may be applied. A method of combining a method of using a precoding vector and a method of changing the angle of the antenna may be applied. Different antenna panels may be switched and utilized. A method of combining methods of using plural combined antenna panels may be applied. Other methods may be applied. Also, plural transmission beams different from one another may be used in, for example, a high frequency band. Using plural transmission beams is referred to as multi-beam operation. Using a single transmission beam is referred to as single beam operation.

In the embodiment of the present invention, "being configured" of a wireless parameter or the like may be being pre-configured or being predetermined of a prescribed value, or may be being configured of a wireless parameter notified by the base station apparatus 100 or the user device 200.

FIG. 1 is a diagram illustrating a configuration example of a radio communication system in the embodiment of the present invention. As illustrated in FIG. 1, the radio communication system in the embodiment of the present invention includes the base station apparatus 100 and the user device 200. In FIG. 1, the base station apparatus 100 and the user device 200 are illustrated respectively singly. However, these are examples. The base station apparatus 100 and the user device 200 may be respectively plural devices.

The base station apparatus 100 is a communication device which provides one or more NR cells, and communicates with the user device 200 wirelessly. The base station apparatus 100 transmits a synchronization signal and system information to the user device 200. For example, the synchronization signal is NR-PSS and NR-SSS. The system information is transmitted, for example, by an NR-PBCH. Also, the system information is referred to as notification information. Both of the base station apparatus 100 and the user device 200 can transmit and receive a signal by performing beamforming. The user device 200 is a communication device having a radio communication function, such as a smartphone, mobile phone, tablet, wearable terminal, M2M (Machine-to-Machine) communication module, and the like, and wirelessly connects to the base station apparatus 100, and utilizes various communication services provided by the radio communication system. In the step of the initial access, the user device 200 transmits a preamble signal of random access to the base station apparatus 100. This random access is performed on the basis of RMSI (Remaining minimum system information) that is system information according to an NR-PDSCH (Physical downlink shared channel) which is scheduled by an NR-PDCCH (Physical downlink control channel), in addition to the system information according to the NR-PBCH received from the base station apparatus 100. For example, the RMSI includes information required for initial access, such as RACH configuration and the like.

As illustrated in FIG. 1, the base station apparatus 100 transmits a DL signal inclusive of the control information to the user device 200 through the PDCCH. In the initial access, the user device 200 performs monitoring based on a search space for the random access in relation to the DL signal. The search space for the random access, for example, includes a PDCCH for scheduling a message 2 as a random access response and a message 4 for resolution of contention. This user device 200 receives a PDSCH to be scheduled in this PDCCH. The search space for the random access includes, for example, a PDCCH corresponding to scheduling a UL signal for retransmitting a message 3. The user device 200 retransmits the message 3 on the basis of scheduling of this PDCCH.

A set of PDCCH candidates to be monitored by the user device 200 are defined as a set of a search space. The set of the PDCCH search space is a set of a common search space or a set of a UE-specific search space. The user device 200 monitors the PDCCH candidates from the set of one or plural search spaces. The base station apparatus 100 locates a PDCCH for a certain user device 200 in the PDCCH search space, and transmits a signal including the PDCCH located in this PDCCH search space to the user device 200.

A search space for random access may be defined as "Type-1 PDCCH common search space". Contents of the "Type-1 PDCCH common search space" may be notified to the user device 200 by information element "ra-SearchSpace" included in RRC (Radio Resource Control) signaling, or may be predetermined.

For example, the PDCCH scheduling the message 2 as a random access response is scrambled in CRC (Cyclic redundancy check) scramble with an RA-RNTI (Random Access—Radio Network Temporary Identifier). Also, for example, the PDCCH scheduling retransmission of the message 3 is scrambled in CRC scramble with a Temporary C-RNTI (Cell-RNTI). Also, for example, the message 4 for performing contention resolution is scrambled in CRC scramble with the Temporary C-RNTI or C-RNTI. In a search space, the user device 200 monitors the control information scrambled in CRC scramble as described above.

It is noted that a message 1 as a random access preamble does not need to be triggered in a search space for the random access. For example, the message 1 may be triggered by RRC signaling. Also, the message 1 may be triggered, for example, by the user device 200. Also, the message 1 may be triggered, for example, by control information through the PDCCH from the network. In relation to this PDCCH, the user device 200 may monitor the common search spaces of other types or UE-specific search space.

Figure 2:
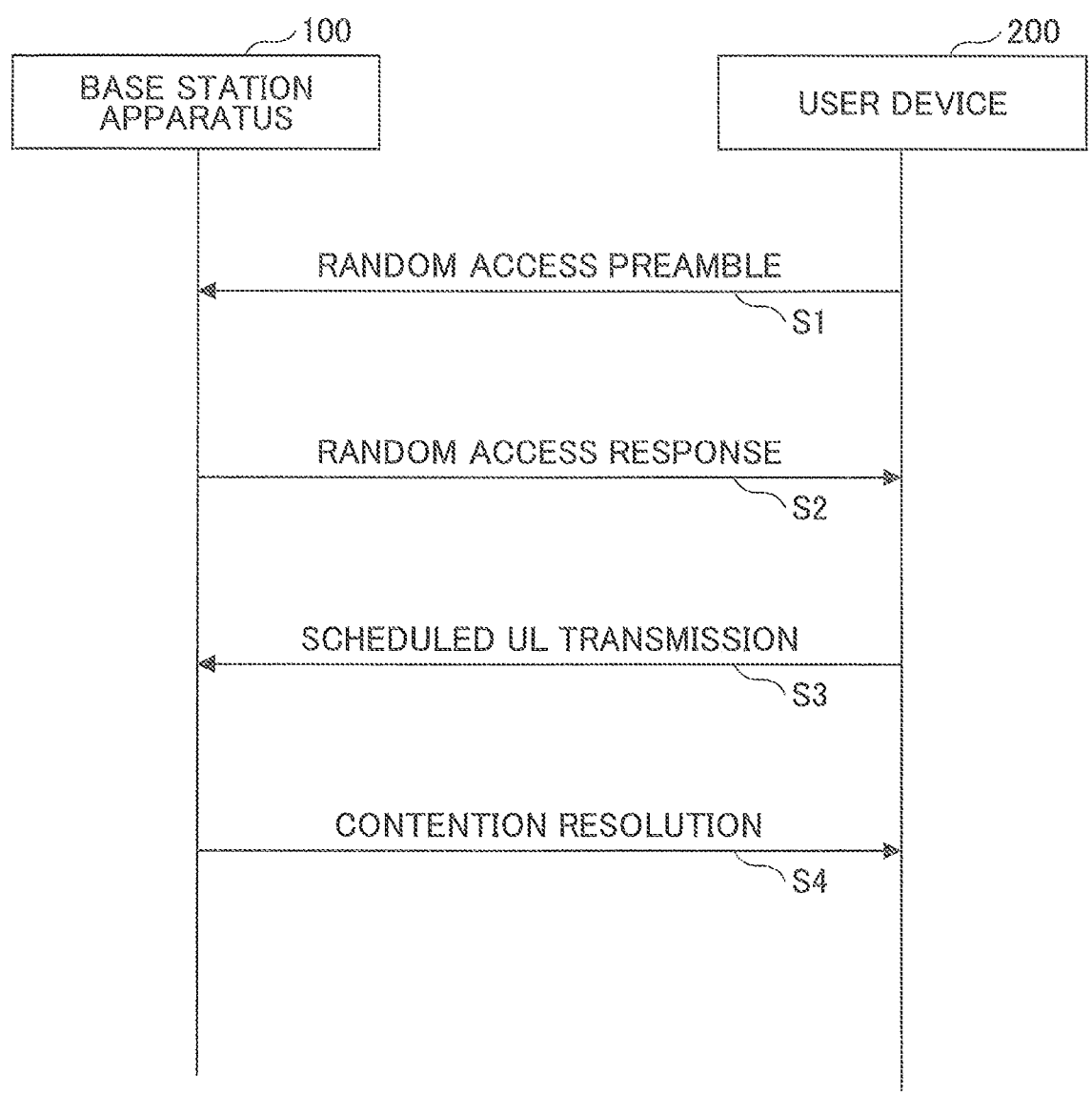
FIG. 2 is a sequence view for describing an example of a random access procedure in the embodiment of the present invention.

FIG. 2 is a sequence diagram for describing an example of a random access sequence in the embodiment of the present invention. FIG. 2 illustrates an example of procedure of contention-based random access. In the case of the contention-based random access, a preamble for use at random is selected from a preamble index of a predetermined range.

In a step S1, the user device 200 transmits a random access preamble (message 1) to the base station apparatus 100 on the basis of information which has been obtained previously from the base station apparatus 100 for identifying RACH resources and the preamble index.

In a step S2, the base station apparatus 100 transmits a random access response (message 2) to the user device 200. The random access response is a response to the random access preamble, and is transmitted to the RA-RNTI through the PDCCH, and includes at least an identifier, timing alignment and initial uplink grant of the random access preamble. In a case of contention-free random access, the random access procedure is terminated in the step S2. In a case of contention-based random access, the flow proceeds to a step S3. In the step S2, the user device 200 monitors a search space for receiving a random access response.

In the step S3, the user device 200 performs the scheduled UL transmission (message 3) to the base station apparatus 100 on the basis of the initial uplink grant included in the random access response received in the step S2. If the message 3 has not been normally received in the base station apparatus 100, scheduling corresponding to instruction for retransmitting the message 3 is transmitted to the user device 200 through the PDCCH. The user device 200 monitors the search space to receive this PDCCH.

In a step S4, at the base station apparatus 100, scheduling corresponding to information for resolving contention is transmitted to the user device 200 through the PDCCH. The user device 200 monitors a search space for receiving this PDCCH. If the resolution of contention is successful according to the information for contention resolution, the user device 200 terminates the random access procedure as the random access has been regarded as successful.

Figure 3:
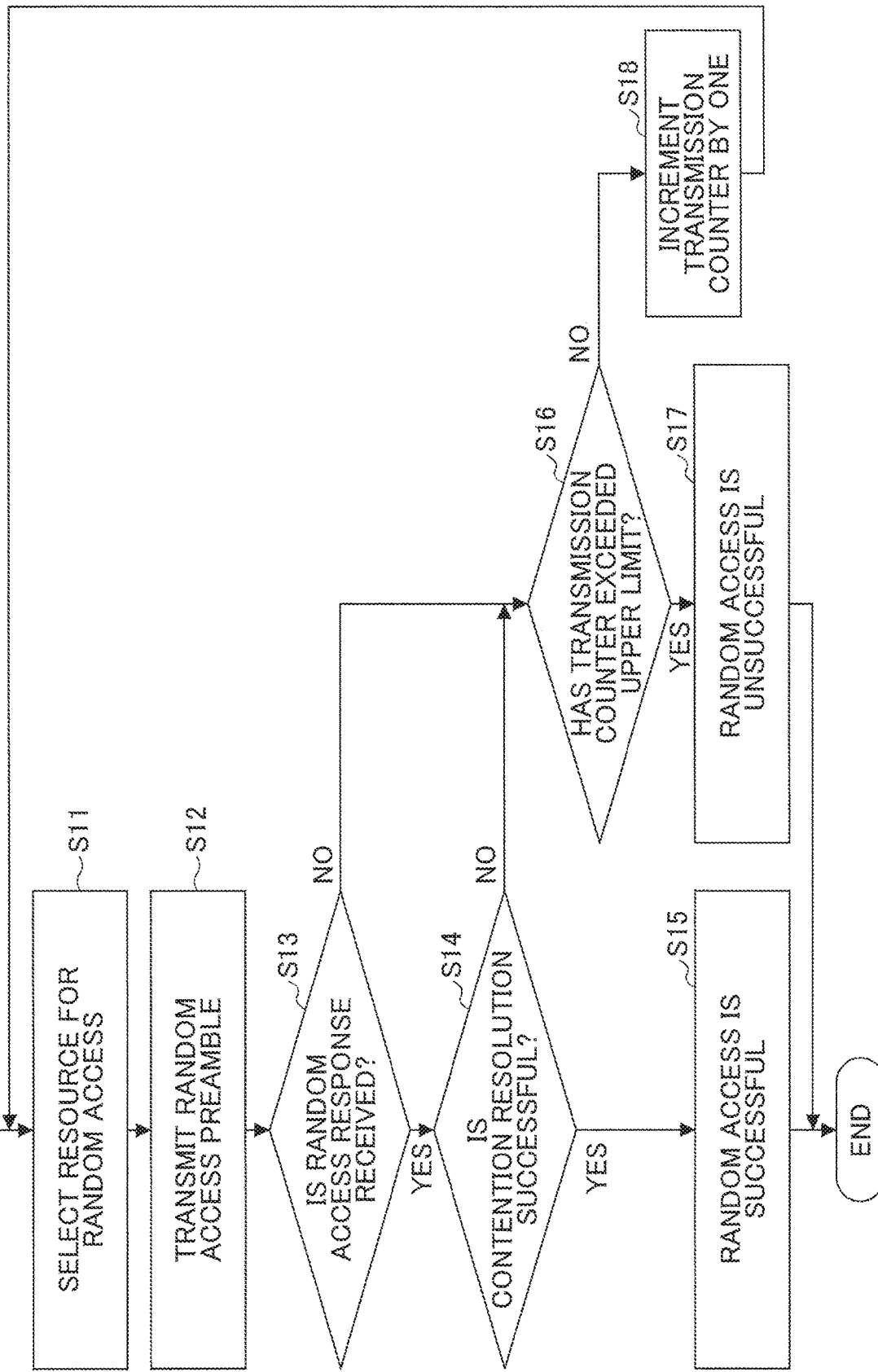
FIG. 3 is a flowchart for describing an example of the random access procedure in the embodiment of the present invention.

FIG. 3 is a flowchart for describing an example of the random access procedure in the embodiment of the present invention. FIG. 3 is a view illustrating one example of contention-based random access procedure. At the time of staring the random access procedure, "1" is set in a transmission counter.

In a step S11, the user device 200 selects a resource for use in the random access procedure on the basis of information identifying a resource for performing the random access procedure received from the base station apparatus 100, namely, information identifying the preamble format, RACH resource and the like identified by the frequency region and time domain. Then the user device 200 transmits a random access preamble (message 1) to the base station apparatus 100 by use of the selected resource (S12).

In a step S13, the base station apparatus 100 transmits a random access response (message 2) to the user device 200. The random access response is a response to the random access preamble, and transmitted to the RA-RNTI at the PDCCH. The PDSCH scheduled by this PDCCH includes at least an identifier of the random access preamble, timing alignment, initial uplink grant and temporary C-RNTI. The user device 200 monitors the search space for receiving the random access response. If the random access response is received by the user device 200 (yes in S13), the flow proceeds to a step S14. If no random access response is received by the user device 200 (no in S13), the flow proceeds to a step S16. If the message 3 has not been normally received in the base station apparatus 100, scheduling corresponding to the instruction for retransmitting the message 3 is transmitted to the user device 200 through the PDCCH. The user device 200 monitors the search space to receive this PDCCH.

In the step S14, the user device 200 performs uplink transmission (message 3) on the basis of the uplink grant included in the random access response. In the uplink transmission, information, which represents at least an RRC connection request and NAS (Non-Access Stratum) UE (User Equipment) identifier, is transmitted. Then the PDSCH, which is transmitted by the base station apparatus 100 to the user device 200 at the temporary C-RNTI or C-RNTI through the PDCCH as resolution of contention (contention resolution, message 4) and is scheduled through the PDCCH, includes at least control information for establishing RRC connection and a predetermined MAC (Medium Access Control) control element transmitted by the user device 200 in the step S14. This MAC control element is used for resolving contention. The user device 200 monitors a search space for receiving the PDCCH scheduling the PDSCH including the message 4. It is noted that contention resolution (step S14) may be performed at the time of performing the contention-based random access, and may not be performed at the time of performing the contention-free random access. The user device 200, if this MAC control element coincides with part of or all of the data transmitted in the step S14 (yes in S14), proceeds to a step S15, and in a case of non-coincidence (no in S14), proceeds to the step S16.

In the step S15, the user device 200 recognizes that the random access is successful. In the use of the temporary C-RNTI, the temporary C-RNTI is made a C-RNTI, to terminate the random access procedure.

In the step S16, the user device 200 determines whether the value of the transmission counter has exceeded a notified or predetermined upper limit. If it has exceeded the upper limit (yes in S16), the flow proceeds to a step S17. If it has not exceeded the upper limit (no in S16), the flow proceeds to a step S18.

In the step S17, the user device 200 recognizes that the random access is unsuccessful, and terminates the random access procedure. On the other hand, in the step S18, the user device 200 increments the transmission counter by one, returns to the step S11 for retransmitting the random access preamble, and selects random access resources again.

As described above, the user device 200 in the random access procedure monitors the search space for random access, namely the Type-1 PDCCH common search space. However, PDCCH candidates may be monitored unnecessarily if the user device 200 always monitors the Type-1 PDCCH common search space. There is a limit in the number of PDCCH candidates that can be monitored by the user device 200. Thus, resources to be consumed increase if the user device 200 always monitors the Type-1 PDCCH common search space, so that influence occurs to monitoring of other types of search space.

In view of this, a time domain for monitoring the search space for random access, namely the Type-1 PDCCH common search space, is limited, so that the user device 200 can perform monitoring the search space with good efficiency. To be specific, the user device 200 can monitor the search space on the basis of a valid period defined for the search space. To this end, the base station apparatus 100 locates the PDCCH addressed to a certain user device 200 to be included in this search space on the basis of the valid period defined for the search space, to transmit the PDCCH to the same user device 200.

The point at which the user device 200 starts monitoring of the Type-1 PDCCH common search space is defined to be any one of the following points.

1. Starting point of a RAR (random access response) window for receiving the message 2
2. Transmission point of the message 1
3. Starting point of monitoring the PDCCH corresponding to the message 2

The point at which the user device 200 terminates monitoring of the Type-1 PDCCH common search space is defined to be any one of the following points.

4. Completing point of the random access procedure
5. Completing point of reception of the message 4
6. Completing point of resolution of contention with the message 4.

In relation to the starting points 1., 2. or 3. of monitoring of the Type-1 PDCCH common search space, and the terminating points 4., 5. or 6. of monitoring of the Type-1 PDCCH common search space, it is possible to identify a time domain for monitoring of the Type-1 PDCCH common search space according to any one of combinations of those points.

Furthermore, the monitoring may be defined, for example, in the manner of 7. below.

7. The user device 200 uses the Type-1 PDCCH common search space only for a case of monitoring the PDCCH for scheduling the message 2, scheduling instruction for retransmission of the message 3, or scheduling the message 4.

Also, for example, the Type-1 PDCCH common search space may be used for any of the cases of the above-described 1.-7. in order that the user device 200 monitors a PDCCH to be received after receiving the message 4 until search spaces of other types are configured in the user device 200. Also, the Type-1 PDCCH common search space may be used for any of the cases of the above-described 1.-7. in order that the user device 200 monitors a PDCCH to be received after terminating a random access procedure until a search space of another type is configured in the user device 200.

For example, the operation of the user device 200 may be determined in standardization specification as follows.

A determination example of standardization specification: the user device 200 monitors the Type-1 PDCCH common search space only in a term from starting of the RAR window until terminating of the random access procedure.

According to the above-described embodiment, the user device 200 in a random access procedure can perform monitoring of the search space efficiently by identifying a search space in a time domain, inclusive of PDCCH candidates received from the base station apparatus 100. Also, the user device 200 can perform monitoring of the search space efficiently by using a search space of a particular type, only while a PDCCH scheduling a particular message is received.

In short, the user device can identify a search space for use in the random access procedure in the NR, and perform monitoring efficiently.

Device Configuration

An example of a functional arrangement of the base station apparatus 100 and the user device 200 for performing tasks and operations described heretofore is described next. The base station apparatus 100 and the user device 200 include functions for executing the above-described embodiment. However, each of the base station apparatus 100 and the user device 200 may include only functions of part of the embodiment.

Base Station Apparatus 100

Figure 4:
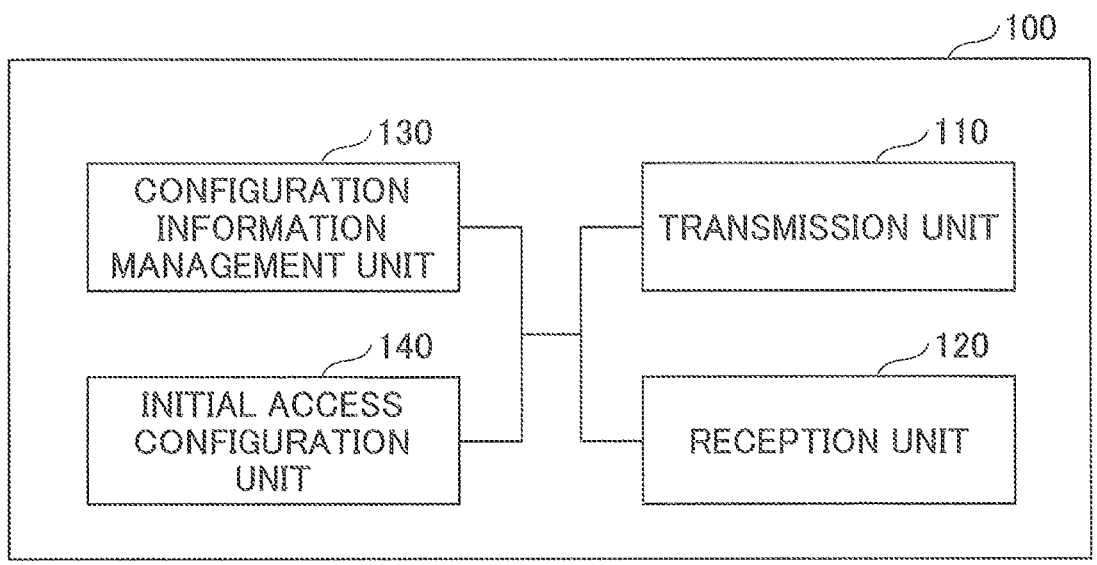
FIG. 4 is a view illustrating one example of a functional configuration of a base station apparatus 100 in the embodiment of the present invention.

FIG. 4 is a view illustrating one example of a functional arrangement of the base station apparatus 100. As illustrated in FIG. 4, the base station apparatus 100 includes a transmission unit 110, a reception unit 120, a configuration information management unit 130 and an initial access configuration unit 140. The functional arrangement illustrated in FIG. 4 is only one example. Division of the functions and names of functional components can be determined optionally so that tasks related to the embodiment of the present invention can be performed.

The transmission unit 110 includes a function for generating a signal to transmit to the side of the user device 200, and for transmitting this signal wirelessly. The reception unit 120 has a function for receiving various types of signals transmitted by the user device 200, and obtaining information from the received signals, for example, information of a higher layer. Also, the transmission unit 110 has a function for transmitting NR-PSS, NR-SSS, NR-PBCH and DL/UL control signals and the like to the user device 200. For example, the transmission unit 110 transmits UL scheduling or notification information to the user device 200, the notification information including information for use in the initial access. The reception unit 120 has a function of receiving a RACH preamble from the user device 200.

The configuration information management unit 130 stores predetermined configuration information, and various items of configuration information to be transmitted to the user device 200. Contents of the configuration information are, for example, information related to transmission/reception parameters for initial access or the like.

The initial access configuration unit 140 as described in the embodiment notifies the user device 200 of information to be used in the initial access, and performs processing at the time of receiving the random access preamble transmitted from the user device 200, transmission of the random access response, and the like. Also, the initial access configuration unit 140 locates a PDCCH to be transmitted to the user device 200 in a predetermined search space, such as the Type-1 PDCCH common search space.

User Device 200

Figure 5:
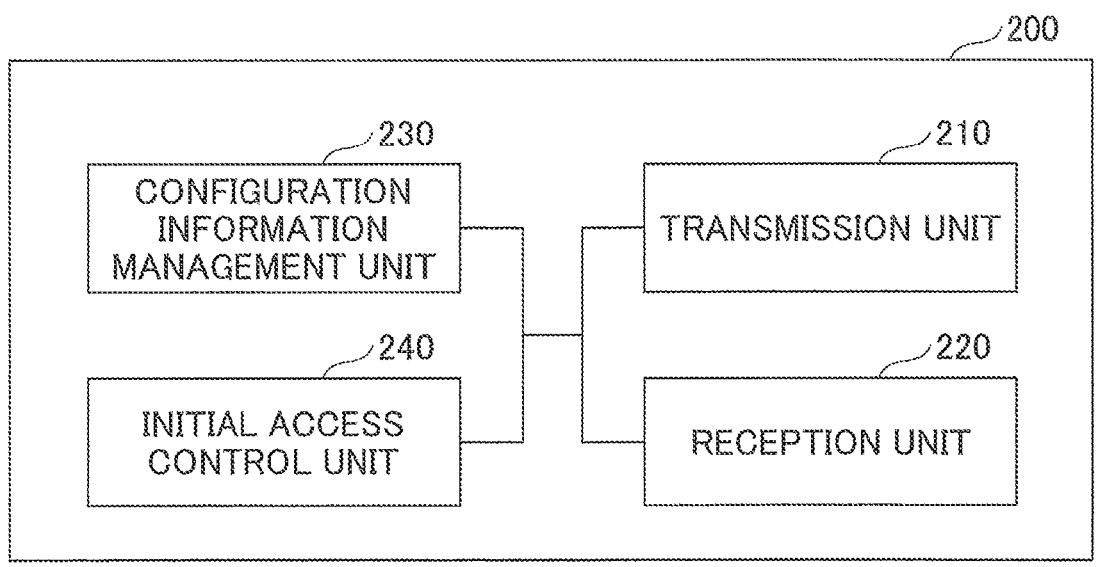
FIG. 5 is a view illustrating one example of a functional configuration of a user device 200 in the embodiment of the present invention.

FIG. 5 is a view illustrating one example of a functional arrangement of the user device 200. As illustrated in FIG. 5, the user device 200 includes a transmission unit 210, a reception unit 220, a configuration information management unit 230 and an initial access control unit 240. The functional arrangement illustrated in FIG. 5 is only one example. Division of the functions and names of functional components can be determined optionally so that tasks related to the embodiment of the present invention can be performed.

The transmission unit 210 generates a signal for transmission from data for transmission, and wirelessly transmits this signal for transmission. The reception unit 220 wirelessly receives various signals, and obtains signals of upper layers from the received signals of the physical layer. Also, the reception unit 220 has functions for receiving NR-PSS, NR-SSS, NR-PBCH, DL/UL control signals or the like transmitted by the base station apparatus 100. The transmission unit 210 has, for example, functions for transmitting NR-PRACH, NR-PUSCH and the like to the base station apparatus 100.

The configuration information management unit 230 stores various items of the configuration information received by the reception unit 220 from the base station apparatus 100 or the user device 200. Also, the configuration information management unit 230 stores predetermined configuration information. Contents of the configuration information are, for example, information related to transmission/reception parameters for initial access or the like.

The initial access control unit 240, as described in the embodiment, generates a preamble and message related to the initial access to be transmitted from the user device 200 to the base station apparatus 100. Also, the initial access control unit 240 obtains a PDCCH address to the same user device by monitoring a predetermined search space, such as the Type-1 PDCCH common search space. Functional components related to signal transmission in the initial access control unit 240 may be included in the transmission unit 210. Functional components related to signal reception in the initial access control unit 240 may be included in the reception unit 220.

Hardware Configuration

The views for the functional arrangement (FIGS. 4A and 5) used for describing the above-described embodiment of the present invention illustrate blocks in units of functions. These functional blocks (components) are implemented by any combination of hardware and/or software. Furthermore, means for implementing each functional block is not particularly limited. Namely, each functional block may be implemented by a single device with plural elements that are physically and/or logically coupled, or may be implemented by plural devices obtained by directly and/or indirectly (e.g., by wire and/or wirelessly) connecting the two or more devices separated physically and/or logically.

Figure 6:
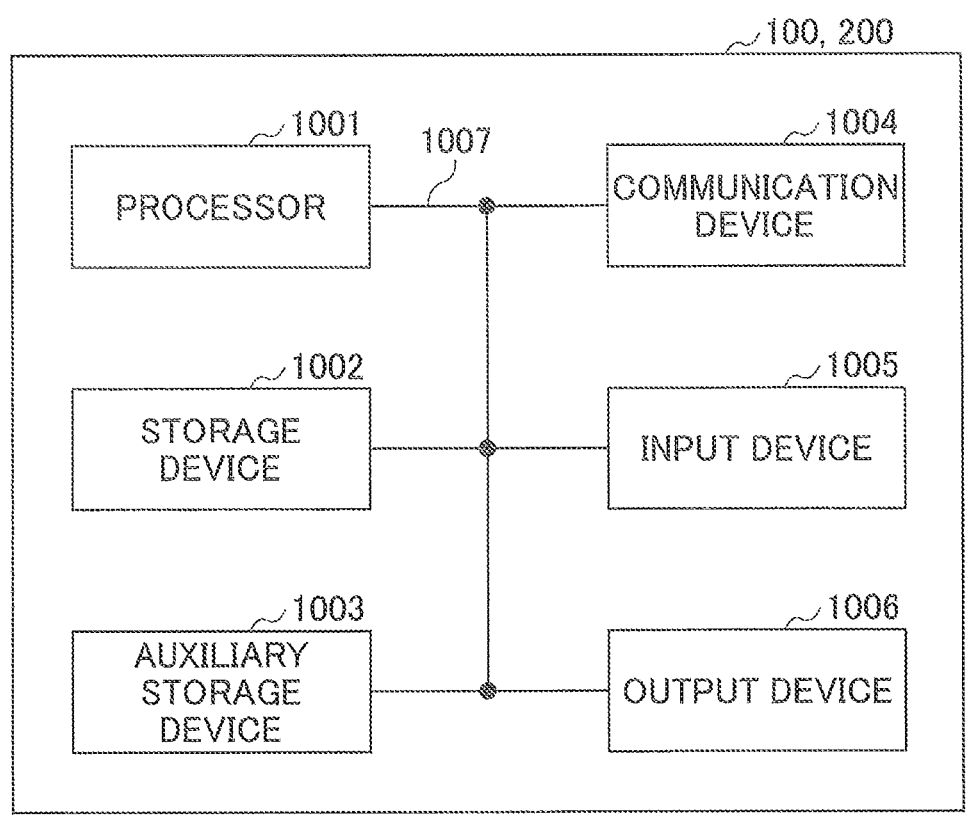
FIG. 6 is a view illustrating one example of a hardware configuration of the base station apparatus 100 or the user device 200 in the embodiment of the present invention.

For example, the base station apparatus 100 and the user device 200 in one embodiment of the present invention may function as computers for performing processes related to the embodiment according to the present invention. FIG. 6 is a diagram illustrating one example of a hardware configuration of a radio communication device being the base station apparatus 100 or the user device 200 according to the embodiment of the present invention. Each of the base station apparatus 100 and the user device 200 described above can be configured physically as a computer device including a processor 1001, a storage device 1002, an auxiliary storage device 1003, a communication device 1004, an input device 1005, an output device 1006, a bus 1007 and the like.

Note that, in the following description, the term "apparatus" may be replaced with a circuit, device, unit and the like. The hardware configuration of the base station apparatus 100 and the user device 200 may be configured to include one or more of the respective devices illustrated in the figures and denoted at 1001-1006, or may be configured without including a part of the devices.

The respective functions in the base station apparatus 100 and the user device 200 are realized by reading predetermined software (programs) on hardware such as the processor 1001, the storage device 1002 and the like, performing calculation in the processor 1001, and controlling communication in the communication device 1004 and reading and/or writing of data in the storage device 1002 and the auxiliary storage device 1003.

For example, the processor 1001 causes an Operating System to operate so as to control the entire computer. The processor 1001 may be formed of a central processing unit (CPU: Central Processing Unit) including an interface with a peripheral device, control device, arithmetic unit, register, and the like.

Furthermore, the processor 1001 reads a program (program code), software module, or data from the auxiliary storage device 1003 and/or the communication device 1004 to the storage device 1002, and executes various processes in accordance with these. As the program, a program is used that is for causing a computer to execute at least a part of the operation described in the embodiment above. For example, the transmission unit 110, the reception unit 120, the configuration information management unit 130 and the initial access configuration unit 140 in the base station apparatus 100 illustrated in FIG. 4 may be implemented by a control program stored in the storage device 1002 and executed by the processor 1001. Also, for example, the transmission unit 210, the reception unit 220, the configuration information management unit 230 and the initial access control unit 240 in the user device 200 illustrated in FIG. 5 may be implemented by a control program stored in the storage device 1002 and executed by the processor 1001. It is described that the above-described various processes are performed by the single processor 1001, but they may be simultaneously or sequentially performed by two or more processors 1001. The processor 1001 may be implemented by one or more chips. Note that the program may be transmitted from a network through an electrical communication line.

The storage device 1002 is a computer readable recording medium, and may be formed of, for example, at least one of a ROM (Read Only Memory), EPROM (Erasable Programmable ROM), EEPROM (Electrically Erasable Programmable ROM), RAM (Random Access Memory) and the like. The storage device 1002 may be referred to as a register, cache, main memory (main storage device) and the like. The storage device 1002 can store a program (program code), a software module and the like executable for performing processing according to one embodiment of the present invention.

The auxiliary storage device 1003 is a computer readable recording medium, and can be formed of, for example, at least one of an optical disc such as a CD-ROM (Compact Disc ROM), hard disk drive, flexible disc, magneto-optical disk (for example, compact disk, digital versatile disk, and Blu-ray (registered trademark) disk), smart card, flash memory (e.g., card, stick and key drive), floppy (registered trademark) disk, magnetic strip, and the like. The auxiliary storage device 1003 may be referred to as an auxiliary storage device. The above-described storage medium may be, for example, a database, server, or any other appropriate medium, including the storage device 1002 and/or the auxiliary storage device 1003.

The communication device 1004 is hardware (transmission/reception device) for executing communication between computers through a wired and/or wireless network, and is also referred to as, for example, a network device, network controller, network card, communication module, and the like. For example, the transmission unit 110 and the reception unit 120 in the base station apparatus 100 may be implemented by the communication device 1004. Also, the transmission unit 210 and the reception unit 220 in the user device 200 may be implemented by the communication device 1004.

The input device 1005 is an input device for receiving an input from the outside (e.g., a keyboard, mouse, microphone, switch, button, sensor and the like). The output device 1006 is an output device for implementing an output to the outside (e.g., a display, speaker, LED lamp and the like). Note that the input device 1005 and the output device 1006 may be configured to be integrated (for example, a touch panel).

Furthermore, the respective devices, such as the processor 1001 and the storage device 1002, are connected by the bus 1007 for communication of information. The bus 1007 may be formed of a single bus, or may be formed of different buses among the devices.

Furthermore, the base station apparatus 100 and the user device 200 may be constituted to include hardware, such as a microprocessor, digital signal processor (DSP: Digital Signal Processor), ASIC (Application Specific Integrated Circuit), PLD (Programmable Logic Device), FPGA (Field Programmable Gate Array), and the like. By the hardware, a part of or all of the functional blocks may be implemented. For example, the processor 1001 may be implemented by at least one of these hardware components.

CONCLUSION OF THE EMBODIMENT

As has been described heretofore, according to the embodiment of the present invention, a user device for communicating with a base station apparatus is provided, comprising a receiving unit configured to receive a DL (Downlink) signal included in a search space as a set of candidates of a PDCCH (Physical downlink control channel) from the base station apparatus, a control unit configured to monitor for obtaining a PDCCH candidate addressed to the user device based on a valid period defined for the search space, and a communication unit configured to receive a PDSCH (Physical downlink shared channel) or transmit a UL (Uplink) signal to the base station apparatus, based on information included in the PDCCH candidate addressed to the user device.

Owing to the configuration described above, the user device 200 can perform monitoring of a search space efficiently by identifying the search space in a time domain inclusive of PDCCH candidates received from the base station apparatus 100 in a random access procedure. Namely, the user device can perform monitoring efficiently by identifying the search space used in the random access procedure in the NR.

The valid period defined for the search space may be a term in which a random access procedure is executed. Owing to this configuration, monitoring of the search space can be performed efficiently as the user device 200 uses the search space of a predetermined type only when a PDCCH for scheduling a particular message is received.

A starting point of the valid period defined for the search space may be any one of a starting point of a window for receiving a random access response, a transmission point of a random access preamble, or a starting point of monitoring a PDCCH corresponding to the random access response. Owing to this configuration, the user device 200 can identify the starting point of the search space.

A terminating point of the valid period defined for the search space is any one of a completing point of the random access procedure, a completing point of reception of a message 4 for resolution of contention, or a completing point of resolution of contention with the message 4. Owing to this configuration, the user device 200 can identify the terminating point of the search space.

After terminating the random access procedure, monitoring for obtaining a PDCCH candidate addressed to the user device may be performed by use of the search space during a term until a search space of a type other than the search space is configured. Owing to this configuration, the user device 200 can transmit and receive data by identifying the search space for use after terminating the random access procedure.

Also, according to an embodiment of the present invention, a base station apparatus for communicating with a user device is provided, comprising a transmission unit configured to transmit a DL (Downlink) signal included in a search space as a set of candidates of a PDCCH (Physical downlink control channel) to the user device, a configuration unit configured to locate a PDCCH candidate addressed to the base station apparatus in the search space based on a valid period defined for the search space, and a receiving unit configured to receive a UL (Uplink) signal transmitted from the user device based on information included in the PDCCH candidate addressed to the base station apparatus.

According to the above-described embodiment, the base station apparatus 100 can identify a search space in a time domain, inclusive of PDCCH candidates in a random access procedure, and locate the search space in the PDCCH so as to perform monitoring of the search space efficiently. In short, the user device can identify a search space for use in the random access procedure in the NR, and perform monitoring efficiently.

Supplement to the Embodiment

The embodiment of the present invention has been described above; however, the disclosed invention is not limited to the embodiment, and a person ordinarily skilled in the art will appreciate various variations, modifications, alternatives, replacements and the like. Specific examples of numerical values are used in the description in order to facilitate understanding of the invention, but these numerical values are merely examples, and any appropriate values may be used, unless otherwise indicated. Divisions of the described items in the above description are not essential to the present invention. Depending on necessity, subject matter described in two or more described items may be combined and used, and subject matter described in a described item may be applied to subject matter described in another described item (unless contradicted). A boundary of a functional component or a processor in the functional block diagrams may not necessarily correspond to a boundary of a physical part. An operation by a plurality of functional components may be physically executed by a single part, or an operation of a single functional component may be physically executed by a plurality of parts. In the sequence charts described in the embodiment, the order can be changed reversely, unless those are contradicted. For the convenience of description, the base station apparatus 100 and the user device 200 are described by using the functional block diagrams; however, such devices may be implemented in hardware, software, or combinations thereof. The software to be operated by the processor included in the base station apparatus 100 in accordance with the embodiment of the present invention, and the software to be operated by the processor included in the user device 200 in accordance with the embodiment of the present invention may be respectively stored in any appropriate storage medium, such as a random access memory (RAM), flash memory, read-only memory (ROM), EPROM, EEPROM, register, hard disk drive (HDD), removable disk, CD-ROM, database, server and the like.

Notification of information is not limited to the aspects/embodiment described in this specification, and may be given by any other methods. For example, the notification of information may be performed by physical layer signaling (for example, Downlink Control Information (DCI), Uplink Control Information (UCI)), higher layer signaling (for example, Radio Resource Control (RRC) signaling, Medium Access Control (MAC) signaling, broadcast information (Master Information Block (MIB), System Information Block (SIB))), or other signals, or a combination thereof. Further, the RRC signaling may be referred to as an RRC message and may be, for example, an RRC Connection Setup message, an RRC Connection Reconfiguration message, or the like.

Each of aspects/embodiment described in the present specification may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide-Band), Bluetooth (registered trademark), a system using other appropriate systems, and/or a next generation system expanded based on these systems.

The processing procedures, the sequences, the flowcharts and the like of the respective aspects/embodiment described in this specification may be reversed in order unless there is a contradiction. For example, the method described in this specification presents elements of various steps in an exemplary order and is not limited to a presented specific order.

A specific operation disclosed to be performed in the base station apparatus 100 in the present specification may be performed in an upper node in some cases. In a network composed of one or plurality of network nodes having the base station apparatus 100, it is apparent that various operations that are performed for communication with the user device 200 can be performed by the base station apparatus 100 and/or another network node different from the base station apparatus 100 (e.g. MME or S-GW, though not limited thereto). Although the case where another network node different from the base station apparatus 100 is single is described in the example above, a combination of a plurality of other network nodes (e.g. MME and S-GW) may be used.

The respective aspects/embodiment disclosed in the present specification can be used singly, used in combination, and used by switching in operation.

The user device 200 can be also referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

The base station apparatus 100 may be referred to by those skilled in the art as NB (NodeB), eNB (evolved node), gNB, base station (Base Station) or several other appropriate terms.

The terms "determining" and "determining" used in this specification may include a wide variety of actions. For example, "determining" and "determining" may include events in which events such as judging, calculating, computing, processing, deriving, investigating, looking up (for example, looking up in a table, a database, or another data structure), or ascertaining are regarded as "determining" or "determining." Further, "determining" and "determining" may include events in which events such as receiving (for example, receiving information), transmitting (for example, transmitting information), input, output, or accessing (for example, accessing data in a memory) are regarded as "determining" or "determining." Further, "determining" and "determining" may include events in which events such as resolving, selecting, choosing, establishing, or comparing are regarded as "determining" or "determining." In other words, "determining" and "determining" may include events in which a certain operation is regarded as "determining" or "determining."

As used in the present specification, the phrase "based on" does not mean "based only on" unless explicitly stated otherwise. In other words, the phrase "based on" means both "based only on" and "based on at least".

As long as the terms "including", "comprising", and variations thereof are used in the specification or claims, these terms are intended to be inclusive similar to the term "comprising". Furthermore, it is intended that the term "or" used in the specification or claims is not an "exclusive OR".

In the entirety of the present disclosure, if an article is added by translation, for example a, an and the in English, the elements with those articles can encompass a plurality of elements, unless otherwise indicated apparently in the context.

It is noted in the embodiment of the present invention that the initial access control unit 240 is one example of the control unit. The initial access configuration unit 140 is one example of the configuration unit. The PDCCH common search space is one example of the search space. The transmission unit 210 or the reception unit 220 is one example of the communication unit.

Although the present invention is described in detail heretofore, it is apparent to those skilled in the art that the present invention is not limited to the embodiment described in this specification. The present invention can be implemented as a modified and changed form without deviating from the spirit and scope of the present invention defined by the claims. Accordingly, the description of the present specification is given solely by way of illustration and does not have any restrictive meaning to the present invention.

REFERENCE SIGNS LIST 100 base station apparatus
110 transmission unit
120 reception unit
130 configuration information management unit
140 initial access configuration unit
200 user device
210 transmission unit
220 reception unit
230 configuration information management unit
240 initial access control unit
1001 processor
1002 storage device
1003 auxiliary storage device
1004 communication device
1005 input device
1006 output device

The invention claimed is:

1. A terminal comprising:
a processor, coupled to a transceiver, that monitors a PDCCH (Physical downlink control channel) candidate in a first search space during a random access procedure; and
wherein the transceiver receives a random access response or a PDSCH (Physical downlink shared channel) for contention resolution from a base station, based on information included in the PDCCH candidate, and
wherein the transceiver receives a PDSCH or transmit an uplink signal based on information included in a PDCCH candidate monitored in the first search space, unless a second search space of a type other than the first search space is configured after the random access procedure is completed.

2. The terminal as claimed in claim 1, wherein the processor starts to monitor the first search space from a time point of starting a window for receiving the random access response or a time point of starting to monitor a PDCCH candidate, and wherein the processor uses a PDCCH candidate including CRC (Cyclic redundancy check) scrambled by RA-RNTI (Random Access-Radio Network Temporary Identifier) for receiving the random access response.

3. The terminal as claimed in claim 1, wherein the processor terminates monitoring the first search space at a time point of having the second search space configured.

4. A base station apparatus comprising:
a transceiver, coupled to a processor, that transmits, to a terminal, a downlink signal configured with a PDCCH (Physical downlink control channel) candidate in a first search space during a random access procedure,
wherein the transceiver transmits a random access response or a PDSCH (Physical downlink shared channel) for contention resolution to the terminal, based on information included in the PDCCH candidate, and
wherein the transceiver transmits a PDSCH or receives an uplink signal based on information included in a PDCCH candidate monitored in the first search space, unless the processor configures a second search space of a type other than the first search space to the terminal after the random access procedure is completed.

5. A communicating method comprising:
monitoring, by a terminal, a PDCCH (Physical downlink control channel) candidate in a first search space during a random access procedure;
receiving, by the terminal, a random access response or a PDSCH (Physical downlink shared channel) for contention resolution from a base station apparatus, based on information included in the PDCCH candidate; and
the monitoring includes receiving a PDCCH or transmitting an uplink signal based on information included in a PDCCH candidate monitored in the first search space, unless a second search space of a type other than the first search space is configured after the random access procedure is completed.

* * * * *